(12) United States Patent
Acocella et al.

(10) Patent No.: US 7,750,915 B1
(45) Date of Patent: Jul. 6, 2010

(54) CONCURRENT ACCESS OF DATA ELEMENTS STORED ACROSS MULTIPLE BANKS IN A SHARED MEMORY RESOURCE

(75) Inventors: Dominic Acocella, Blainville (CA); Mark R. Goudy, Berkeley, CA (US)

(73) Assignee: NVIDIA Corporation, Santa Clara, CA (US)

( * ) Notice: Subject to any disclaimer, the term of this patent is extended or adjusted under 35 U.S.C. 154(b) by 733 days.

(21) Appl. No.: 11/312,076

(22) Filed: Dec. 19, 2005

(51) Int. Cl.
*G06F 15/167* (2006.01)

(52) U.S. Cl. .................. 345/541; 345/543; 345/544

(58) Field of Classification Search ............ 345/541, 345/540
See application file for complete search history.

(56) References Cited

U.S. PATENT DOCUMENTS

| | | | | |
|---|---|---|---|---|
| 5,392,393 | A * | 2/1995 | Deering ................. | 345/505 |
| 5,850,483 | A * | 12/1998 | Takabatake et al. ....... | 382/233 |
| 5,924,111 | A * | 7/1999 | Huang et al. ............ | 711/5 |
| 6,088,783 | A * | 7/2000 | Morton ................. | 712/22 |
| 6,104,413 | A * | 8/2000 | Cheng et al. ........... | 345/552 |
| 6,260,099 | B1 * | 7/2001 | Gilbertson et al. ...... | 710/240 |
| 6,999,091 | B2 * | 2/2006 | Saxena et al. .......... | 345/566 |
| 2002/0085009 | A1 * | 7/2002 | Yamagata .............. | 345/531 |
| 2002/0116595 | A1 * | 8/2002 | Morton ................ | 712/22 |
| 2003/0088610 | A1 * | 5/2003 | Kohn et al. ........... | 709/107 |
| 2005/0251649 | A1 * | 11/2005 | Yamazaki ............. | 712/20 |
| 2006/0136672 | A1 * | 6/2006 | Chaudhry et al. ....... | 711/122 |
| 2007/0094477 | A1 * | 4/2007 | Espasa et al. ......... | 711/217 |

* cited by examiner

*Primary Examiner*—Xiao M Wu
*Assistant Examiner*—Maurice McDowell, Jr.
(74) *Attorney, Agent, or Firm*—Townsend and Townsend and Crew LLP

(57) ABSTRACT

Methods, apparatuses, and systems are presented for performing multiple concurrent accesses in a shared memory resource comprising storing a first group of data elements in data entries across multiple banks in the shared memory resource, a first data element of the first group being stored in a data entry in a first bank; skipping at least one data entry in at least one bank after storing a last data element of the first group, to introduce an offset; following the offset, storing a second group of data elements in data entries across multiple banks in the shared memory resource, a first data element of the second group being stored in a data entry in a second bank different from the first bank; and concurrently accessing the first data element of the first group from the first bank and the first data element of the second group from the second bank.

17 Claims, 9 Drawing Sheets

CONCURRENT ACCESS OF DATA ELEMENTS STORED ACROSS MULTIPLE BANKS IN A SHARED MEMORY RESOURCE

BACKGROUND OF THE INVENTION

Rendering Pipeline Overview

FIG. 1 is a block diagram of a computer system 100 according to an embodiment of the present invention. Computer system 100 includes a central processing unit (CPU) 102 and a system memory 104 communicating via a bus path that includes a memory bridge 105. Memory bridge 105 is connected via a bus path 106 to an I/O (input/output) bridge 107. I/O bridge 107 receives user input from one or more user input devices 108 (e.g., keyboard, mouse) and forwards the input to CPU 102 via bus 106 and memory bridge 105. Visual output is provided on a pixel based display device 110 (e.g., a conventional CRT or LCD based monitor) operating under control of a graphics subsystem 112 coupled to memory bridge 105 via a bus 113. A system disk 114 is also connected to I/O bridge 107. A switch 116 provides connections between I/O bridge 107 and other components such as a network adapter 118 and various add in cards 120, 121. Other components (not explicitly shown), including USB or other port connections, CD drives, DVD drives, and the like, may also be connected to I/O bridge 107. Bus connections among the various components may be implemented using bus protocols such as PCI (Peripheral Component Interconnect), PCI Express (PCI E), AGP (Advanced Graphics Processing), Hypertransport, or any other bus protocol(s), and connections between different devices may use different protocols as is known in the art.

Graphics processing subsystem 112 includes a graphics processing unit (GPU) 122 and a graphics memory 124, which may be implemented, e.g., using one or more integrated circuit devices such as programmable processors, application specific integrated circuits (ASICs), and memory devices. GPU 122 may be configured to perform various tasks related to generating pixel data from graphics data supplied by CPU 102 and/or system memory 104 via memory bridge 105 and bus 113, interacting with graphics memory 124 to store and update pixel data, and the like. For example, GPU 122 may generate pixel data from 2 D or 3 D scene data provided by various programs executing on CPU 102. GPU 122 may also store pixel data received via memory bridge 105 to graphics memory 124 with or without further processing. GPU 122 also includes a scanout module configured to deliver pixel data from graphics memory 124 to display device 110.

CPU 102 operates as the master processor of system 100, controlling and coordinating operations of other system components. In particular, CPU 102 issues commands that control the operation of GPU 122. In some embodiments, CPU 102 writes a stream of commands for GPU 122 to a command buffer, which may be in system memory 104, graphics memory 124, or another storage location accessible to both CPU 102 and GPU 122. GPU 122 reads the command stream from the command buffer and executes commands asynchronously with operation of CPU 102. The commands may include conventional rendering commands for generating images as well as general-purpose computation commands that enable applications executing on CPU 102 to leverage the computational power of GPU 122 for data processing that may be unrelated to image generation.

It will be appreciated that the system shown herein is illustrative and that variations and modifications are possible. The bus topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, graphics subsystem 112 is connected to I/O bridge 107 rather than to memory bridge 105. In still other embodiments, I/O bridge 107 and memory bridge 105 might be integrated into a single chip. The particular components shown herein are optional; for instance, any number of add in cards or peripheral devices might be supported. In some embodiments, switch 116 is eliminated, and network adapter 118 and add in cards 120, 121 connect directly to I/O bridge 107.

The connection of GPU 122 to the rest of system 100 may also be varied. In some embodiments, graphics system 112 is implemented as an add in card that can be inserted into an expansion slot of system 100. In other embodiments, a GPU is integrated on a single chip with a bus bridge, such as memory bridge 105 or I/O bridge 107.

A GPU may be provided with any amount of local graphics memory, including no local memory, and may use local memory and system memory in any combination. For instance, in a unified memory architecture (UMA) embodiment, little or no dedicated graphics memory is provided, and the GPU uses system memory exclusively or almost exclusively. In UMA embodiments, the GPU may be integrated into a bus bridge chip or provided as a discrete chip with a high-speed bus (e.g., PCI E) connecting the GPU to the bridge chip and system memory.

It is also to be understood that any number of GPUs may be included in a system, e.g., by including multiple GPUs on a single graphics card or by connecting multiple graphics cards to bus 113. Multiple GPUs may be operated in parallel to generate images for the same display device or for different display devices.

In addition, GPUs embodying aspects of the present invention may be incorporated into a variety of devices, including general purpose computer systems, video game consoles and other special purpose computer systems, DVD players, handheld devices such as mobile phones or personal digital assistants, and so on.

BRIEF SUMMARY OF THE INVENTION

The present invention relates to methods, apparatuses, and systems for performing multiple concurrent accesses in a shared memory resource, the shared memory resource comprising a plurality of banks, each bank comprising a plurality of data entries, the plurality of banks allowing concurrent access such that multiple data entries, each from a different bank, are capable of being accessed concurrently.

The methods, apparatuses, and systems may comprise (1) storing a first group of data elements in data entries across multiple banks in the shared memory resource, a first data element of the first group of data elements being stored in a data entry in a first bank, (2) skipping at least one data entry in at least one bank after storing a last data element of the first group of data elements, to introduce an offset, (3) following the offset, storing a second group of data elements in data entries across multiple banks in the shared memory resource, a first data element of the second group of data elements being stored in a data entry in a second bank different from the first bank, and (4) concurrently accessing the first data element of the first group of data elements from the first bank and the first data element of the second group of data elements from the second bank.

In one embodiment of the invention, the plurality of banks consists of a number (B) of banks, B being a positive integer. The first group of data elements is stored in a number (D) of data entries, D being a positive integer. The at least one skipped data entry consists of a sufficient number (S) of one or more skipped data entries, S being a positive integer, such that a value of ((D+S) modulo B) is equal to one (1). Each of the first and second groups of data elements may occupy multiple rows of data entries, wherein each row includes one data entry from each of the plurality of banks.

The first data element of the first group of data elements may be accessed by a first processing unit, and the first data element of the second group of data elements may be accessed by a second processing unit. A crossbar switch may be used to allow the first and second processing units to selectively access the first and second banks.

According to an embodiment of the invention, the first processing unit is capable of accessing the first data element of the first group of data elements to perform an operation associated with a single instruction, multiple data (SIMD) instruction, and the second processing unit is capable of accessing the first data element of the second group of data elements to perform a corresponding operation associated with the same SIMD instruction. The first and second processing units may be implemented as separate processing engines in a processing core within a processor. The shared memory resource may be a register file comprising multiple banks of registers.

In one embodiment, the first group of data elements comprises vertex data associated with a first vertex, and the second group of data elements comprises vertex data associated with a second vertex. In another embodiment, the first group of data elements comprises pixel data associated with a first pixel, and the second group of data elements comprises pixel data associated with a second pixel.

DETAILED DESCRIPTION OF THE INVENTION

Figure 1:
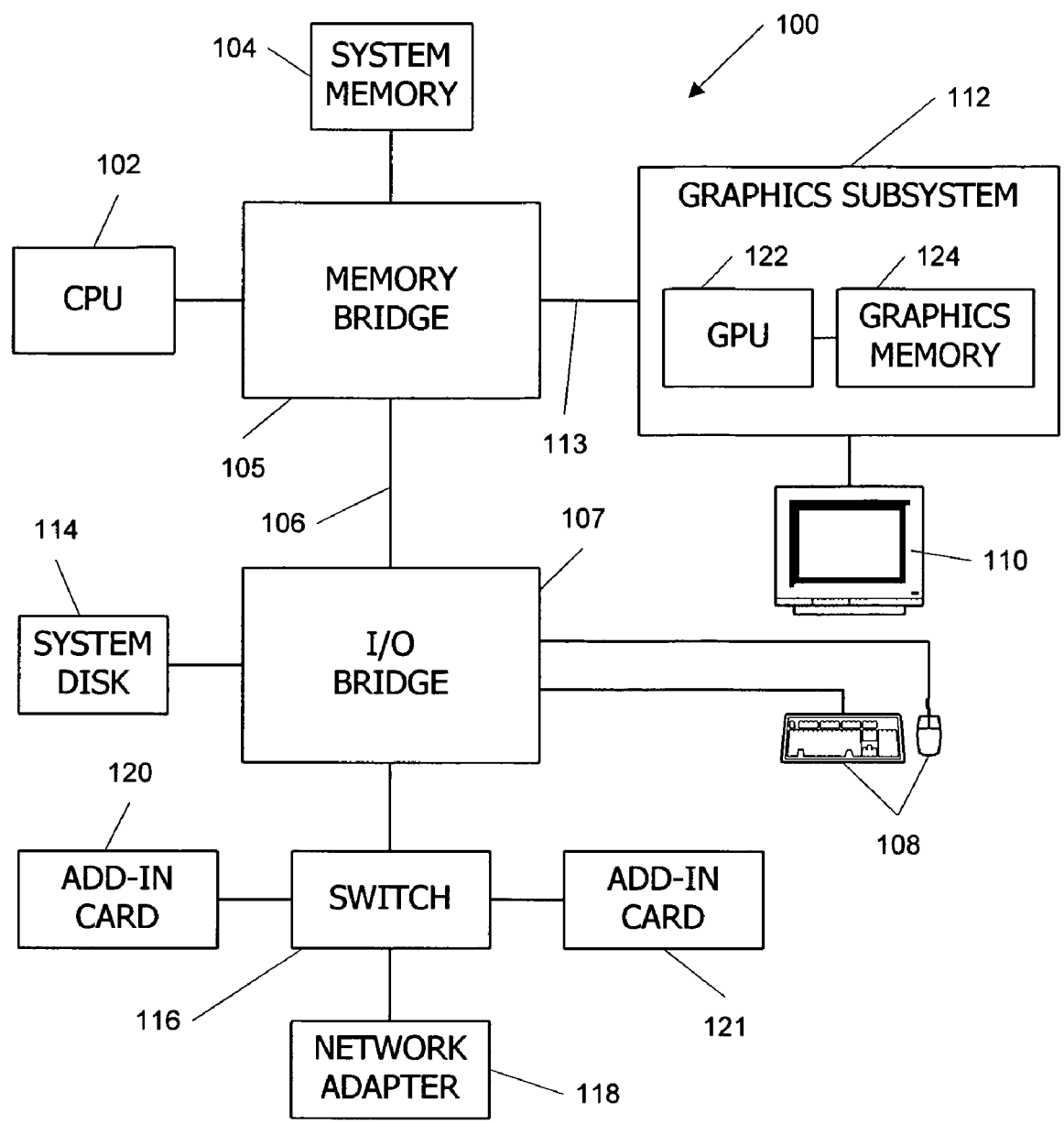
FIG. 1 is a block diagram of a computer system according to an embodiment of the present invention.
Figure 2:
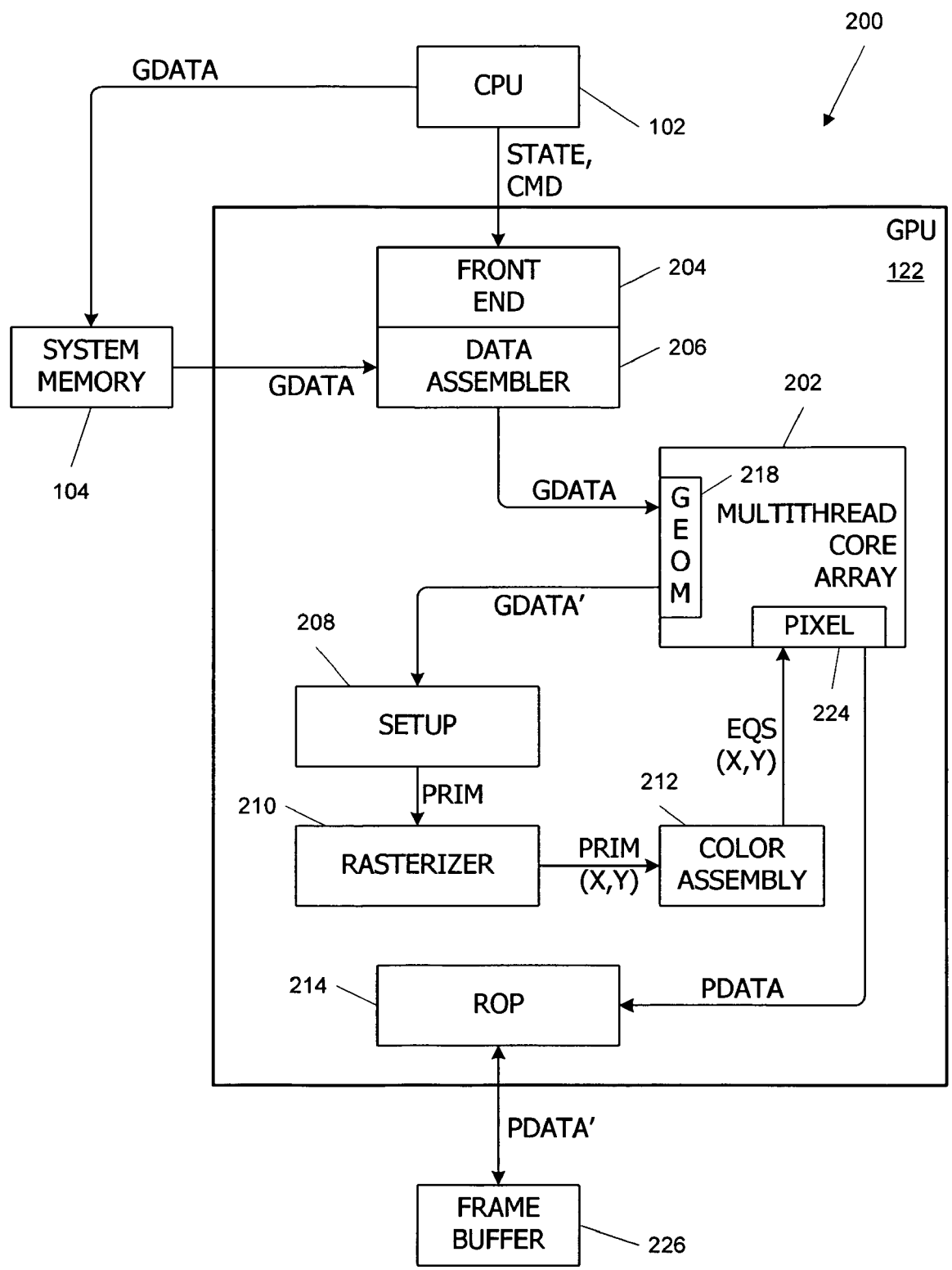
FIG. 2 is a block diagram of a rendering pipeline that can be implemented in a GPU according to an embodiment of the present invention.

FIG. 2 is a block diagram of a rendering pipeline 200 that can be implemented in GPU 122 of FIG. 1 according to an embodiment of the present invention. In this embodiment, rendering pipeline 200 is implemented using an architecture in which any applicable vertex shader programs, geometry shader programs, and pixel shader programs are executed using the same parallel-processing hardware, referred to herein as a "multithreaded core array" 202. Multithreaded core array 202 is described further below.

In addition to multithreaded core array 202, rendering pipeline 200 includes a front end 204 and data assembler 206, a setup module 208, a rasterizer 210, a color assembly module 212, and a raster operations module (ROP) 214, each of which can be implemented using conventional integrated circuit technologies or other technologies.

Front end 204 receives state information (STATE), rendering commands (CMD), and geometry data (GDATA), e.g., from CPU 102 of FIG. 1.

In one embodiment, the geometry data includes a number of object definitions for objects (e.g., a table, a chair, a person or animal) that may be present in the scene. Objects are advantageously modeled as groups of primitives (e.g., points, lines, triangles and/or other polygons) that are defined by reference to their vertices. For each vertex, a position is specified in an object coordinate system, representing the position of the vertex relative to the object being modeled. In addition to a position, each vertex may have various other attributes associated with it. In general, attributes of a vertex may include any property that is specified on a per-vertex basis; for instance, in some embodiments, the vertex attributes include scalar or vector attributes used to determine qualities such as the color, texture, transparency, lighting, shading, and animation of the vertex and its associated geometric primitives.

Primitives, as already noted, are generally defined by reference to their vertices, and a single vertex can be included in any number of primitives. In some embodiments, each vertex is assigned an index (which may be any unique identifier), and a primitive is defined by providing an ordered list of indices for the vertices making up that primitive. Other techniques for defining primitives (including conventional techniques such as triangle strips or fans) may also be used.

Front end 204 directs the geometry data to data assembler 206. Data assembler 206 formats the geometry data and prepares it for delivery to a geometry module 218 in multithreaded core array 202.

Geometry module 218 directs programmable processing engines (not explicitly shown) in multithreaded core array 202 to execute vertex and/or geometry shader programs on the vertex data, with the programs being selected in response to the state information provided by front end 204.

Vertex shader programs and geometry shader programs can be used to implement a variety of visual effects, including lighting and shading effects. For instance, in a simple embodiment, a vertex program transforms a vertex from its 3D object coordinate system to a 3D clip space or world space coordinate system. This transformation defines the relative positions of different objects in the scene. The vertex shader program applies this transformation matrix to each vertex of the primitives making up an object. More complex vertex shader programs can be used to implement a variety of visual effects, including lighting and shading, procedural geometry, and animation operations.

Geometry shader programs differ from vertex shader programs in that geometry shader programs operate on primitives (groups of vertices) rather than individual vertices. Thus, in some instances, a geometry program may create new vertices and/or remove vertices or primitives from the set of objects being processed. In some embodiments, passes through a vertex shader program and a geometry shader program can be alternated to process the geometry data.

In some embodiments, vertex shader programs and geometry shader programs are executed using the same programmable processing engines in multithreaded core array 202. Thus, at certain times, a given processing engine may operate as a vertex shader, receiving and executing vertex program instructions, and at other times the same processing engine may operate as a geometry shader, receiving and executing geometry program instructions. The processing engines can be multithreaded, and different threads executing different types of shader programs may be in flight concurrently in multithreaded core array 202.

After the vertex and/or geometry shader programs have executed, geometry module 218 passes the processed geometry data (GDATA') to setup module 208. Setup module 208, which may be of generally conventional design, generates edge equations from the clip space or screen space coordinates of each primitive; the edge equations are advantageously usable to determine whether a point in screen space is inside or outside the primitive.

Setup module 208 provides each primitive (PRIM) to rasterizer 210. Rasterizer 210, which may be of generally conventional design, determines which (if any) pixels are covered by the primitive, e.g., using conventional scan-conversion algorithms. As used herein, a "pixel" (or "fragment") refers generally to a region in 2-D screen space for which a single color value is to be determined; the number and arrangement of pixels can be a configurable parameter of rendering pipeline 200 and might or might not be correlated with the screen resolution of a particular display device. As is known in the art, pixel color may be sampled at multiple locations within the pixel (e.g., using conventional supersampling or multisampling techniques), and in some embodiments, supersampling or multisampling is handled within the pixel shader.

After determining which pixels are covered by a primitive, rasterizer 210 provides the primitive (PRIM), along with a list of screen coordinates (X,Y) of the pixels covered by the primitive, to a color assembly module 212. Color assembly module 212 associates the primitives and coverage information received from rasterizer 210 with attributes (e.g., color components, texture coordinates, surface normals) of the vertices of the primitive and generates plane equations (or other suitable equations) defining some or all of the attributes as a function of position in screen coordinate space.

Color assembly module 212 provides the attribute equations (EQS, which may include e.g., the plane-equation coefficients A, B and C) for each primitive that covers at least one pixel and a list of screen coordinates (X,Y) of the covered pixels to a pixel module 224 in multithreaded core array 202. Pixel module 224 directs programmable processing engines (not explicitly shown) in multithreaded core array 202 to execute one or more pixel shader programs on each pixel covered by the primitive, with the program(s) being selected in response to the state information provided by front end 204. As with vertex shader programs and geometry shader programs, rendering applications can specify the pixel shader program to be used for any given set of pixels. Pixel shader programs can be used to implement a variety of visual effects, including lighting and shading effects, reflections, texture blending, procedural texture generation, and so on.

Pixel shader programs are advantageously executed in multithreaded core array 202 using the same programmable processing engines that also execute the vertex and/or geometry shader programs. Thus, at certain times, a given processing engine may operate as a vertex shader, receiving and executing vertex program instructions; at other times the same processing engine may operate as a geometry shader, receiving and executing geometry program instructions; and at still other times the same processing engine may operate as a pixel shader, receiving and executing pixel shader program instructions.

Once processing for a pixel or group of pixels is complete, pixel module 224 provides the processed pixels (PDATA) to ROP 214. ROP 214, which may be of generally conventional design, integrates the pixel values received from pixel module 224 with pixels of the image under construction in frame buffer 226, which may be located, e.g., in graphics memory 124. In some embodiments, ROP 214 can mask pixels or blend new pixels with pixels previously written to the rendered image.

It will be appreciated that the rendering pipeline described herein is illustrative and that variations and modifications are possible. The pipeline may include different units from those shown and the sequence of processing events may be varied from that described herein.

Multithreaded Core Array Configuration

Figure 3:
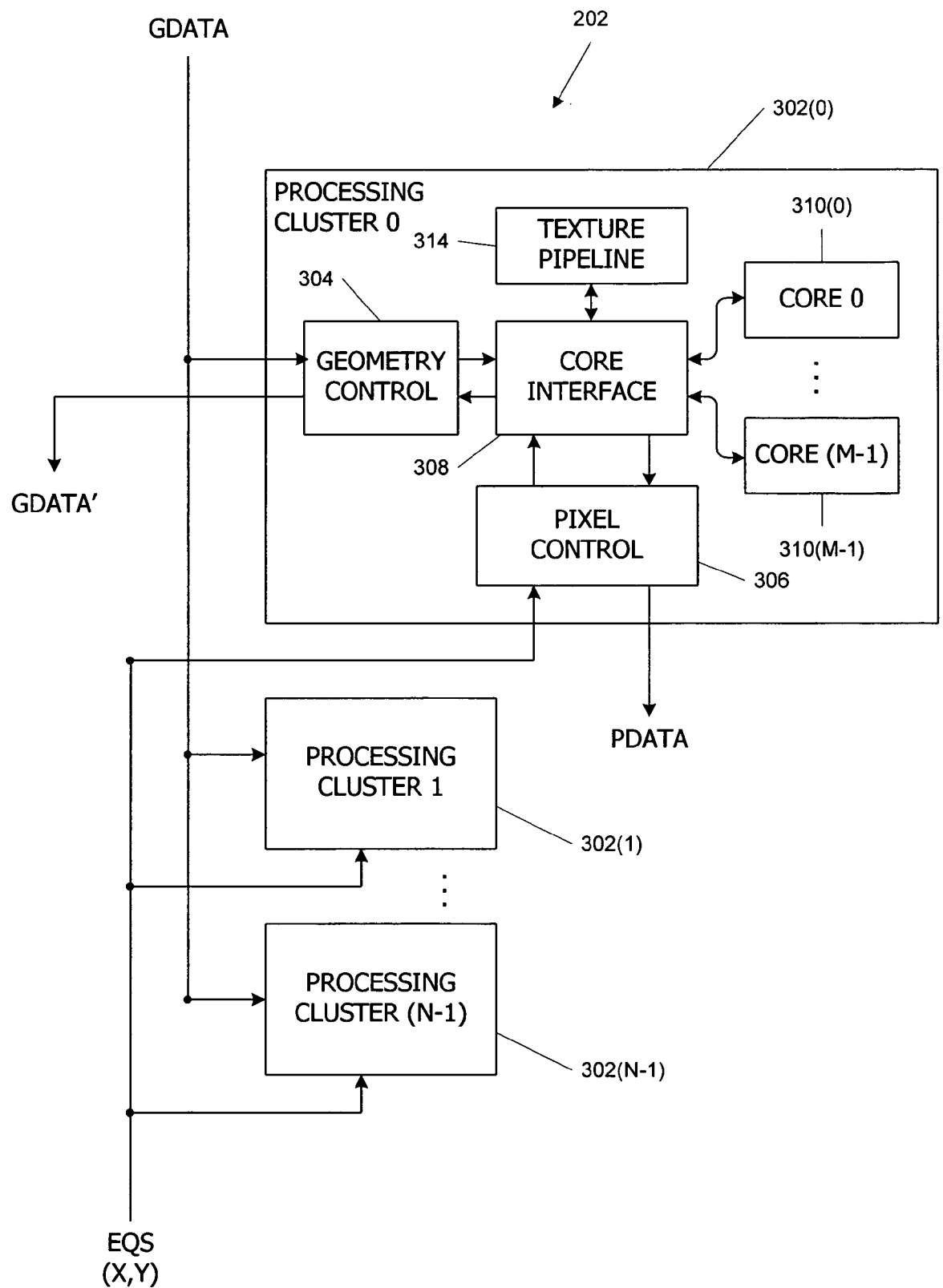
FIG. 3 is a block diagram of multithreaded core array according to an embodiment of the present invention.

In one embodiment, multithreaded core array 202 provides a highly parallel architecture that supports concurrent execution of a large number of instances of vertex, geometry, and/or pixel shader programs in various combinations. FIG. 3 is a block diagram of multithreaded core array 202 according to an embodiment of the present invention.

In this embodiment, multithreaded core array 202 includes some number (N) of processing clusters 302. Herein, multiple instances of like objects are denoted with reference numbers identifying the object and parenthetical numbers identifying the instance where needed. Any number N (e.g., 1, 4, 8, or any other number) of processing clusters may be provided. In FIG. 3, one processing cluster 302 is shown in detail; it is to be understood that other processing clusters 302 can be of similar or identical design.

Each processing cluster 302 includes a geometry controller 304 (implementing geometry module 218 of FIG. 2) and a pixel controller 306 (implementing pixel module 224 of FIG. 2). Geometry controller 304 and pixel controller 306 each communicate with a core interface 308. Core interface 308 controls a number (M) of cores 310 that include the processing engines of multithreaded core array 202. Any number M (e.g., 1, 2, 4 or any other number) of cores 310 may be connected to a single core interface. Each core 310 is advantageously implemented as a multithreaded execution core capable of supporting a large number (e.g., 100 or more) of concurrent execution threads (where the term "thread" refers to an instance of a particular program executing on a particular set of input data), including a combination of vertex threads, geometry threads, and pixel threads. An example architecture for a representative core 310 is described below with reference to FIG. 4.

Core interface 308 also controls a texture pipeline 314 that is shared among cores 310. Texture pipeline 314, which may be of generally conventional design, advantageously includes logic circuits configured to receive texture coordinates, to fetch texture data corresponding to the texture coordinates from memory, and to filter the texture data according to various algorithms. Conventional filtering algorithms including bilinear and trilinear filtering may be used. When a core 310 encounters a texture instruction in one of its threads, it provides the texture coordinates to texture pipeline 314 via core interface 308. Texture pipeline 314 processes the texture instruction and returns the result to the core 310 via core interface 308.

In operation, data assembler 206 (FIG. 2) provides geometry data GDATA to processing clusters 302. In one embodiment, data assembler 206 divides the incoming stream of geometry data into portions and selects, e.g., based on availability of execution resources, which of processing clusters 302 is to receive the next portion of the geometry data. That portion is delivered to geometry controller 304 in the selected processing cluster 302.

Geometry controller 304 forwards the received data to core interface 308, which loads the vertex data into a core 310, then instructs core 310 to launch the appropriate vertex shader program. Upon completion of the vertex shader program, core interface 308 signals geometry controller 304. If a geometry shader program is to be executed, geometry controller 304 instructs core interface 308 to launch the geometry shader program. In some embodiments, the processed vertex data is returned to geometry controller 304 upon completion of the vertex shader program, and geometry controller 304 instructs core interface 308 to reload the data before executing the geometry shader program. After completion of the vertex shader program and/or geometry shader program, geometry controller 304 provides the processed geometry data (GDATA') to setup module 208 of FIG. 2.

At the pixel stage, color assembly module 212 (FIG. 2) provides attribute equations EQS for a primitive and pixel coordinates (X,Y) of pixels covered by the primitive to processing clusters 302. In one embodiment, color assembly module 212 divides the incoming stream of coverage data into portions and selects, e.g., based on availability of execution resources, which of processing clusters 302 is to receive the next portion of the data. That portion is delivered to pixel controller 306 in the selected processing cluster 302.

Pixel controller 306 delivers the data to core interface 308, which loads the pixel data into a core 310, then instructs the core 310 to launch the pixel shader program. Where core 310 is multithreaded, pixel shader programs, geometry shader programs, and vertex shader programs can all be executed concurrently in the same core 310. Upon completion of the pixel shader program, core interface 308 delivers the processed pixel data to pixel controller 306, which forwards the pixel data PDATA to ROP unit 214 (FIG. 2).

It will be appreciated that the multithreaded core array described herein is illustrative and that variations and modifications are possible. Any number of processing clusters may be provided, and each processing cluster may include any number of cores.

The multithreaded core array can also be leveraged to perform general-purpose computations that might or might not be related to rendering images. In one embodiment, any computation that can be expressed in a data-parallel decomposition can be handled by the multithreaded core array as an array of threads executing in a single core. Results of such computations can be written to the frame buffer and read back into system memory.

Core Architecture

Figure 4:
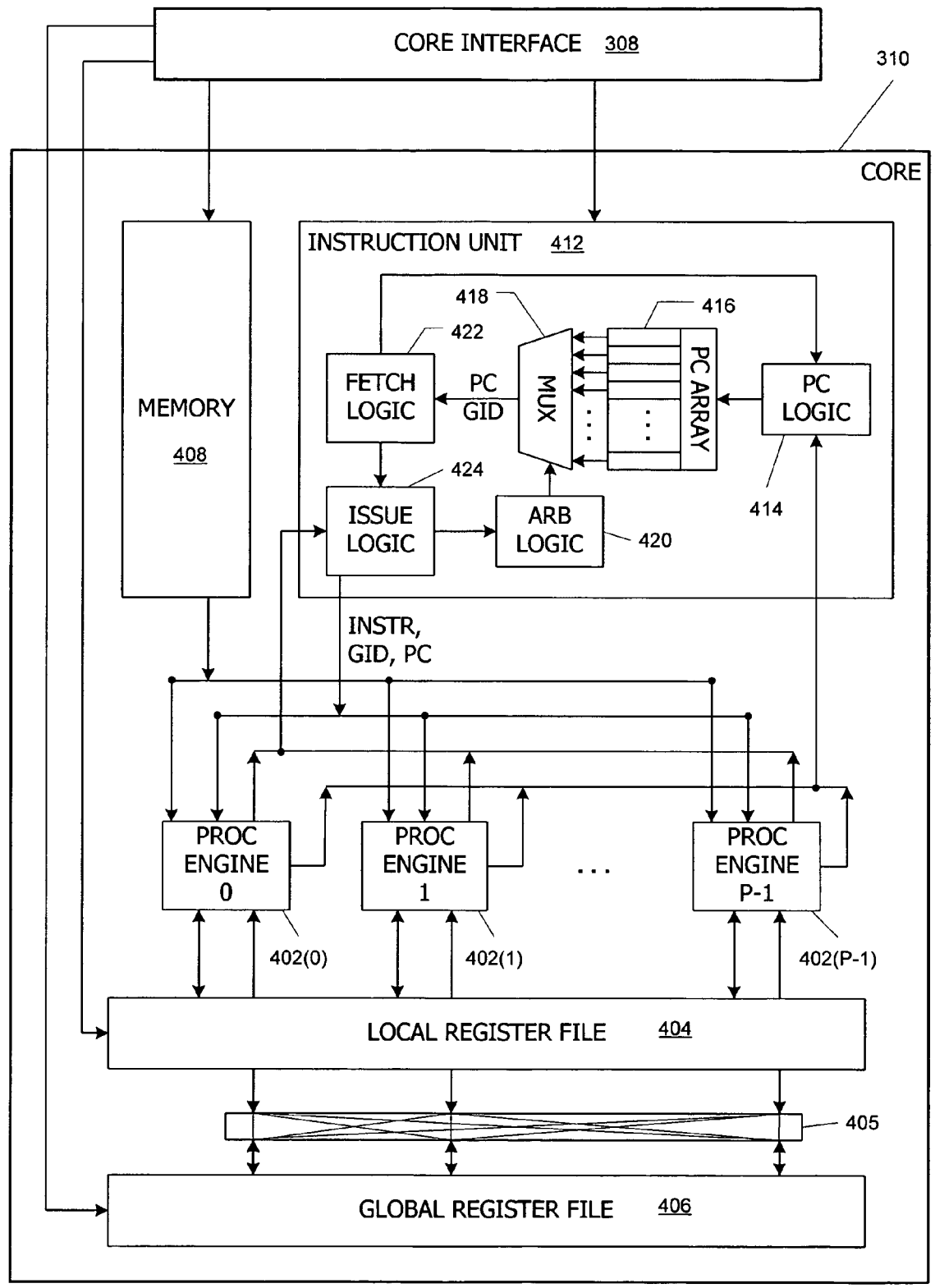
FIG. 4 is a block diagram of a core according to an embodiment of the present invention.

FIG. 4 is a block diagram of a core 310 according to an embodiment of the present invention. Core 310 is advantageously configured to execute a large number of threads in parallel, where the term "thread" refers to an instance of a particular program executing on a particular set of input data. For example, a thread can be an instance of a vertex shader program executing on the attributes of a single vertex or a pixel shader program executing on a given primitive and pixel. In some embodiments, single-instruction, multiple-data (SIMD) instruction issue techniques are used to support parallel execution of a large number of threads without providing multiple independent instruction fetch units.

In one embodiment, core 310 includes an array of P (e.g., 16) parallel processing engines 402 configured to receive SIMD instructions from a single instruction unit 412. Each parallel processing engine 402 advantageously includes an identical set of functional units (e.g., arithmetic logic units, etc.). The functional units may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

Each processing engine 402 is allocated space in a local register file 404 for storing its local input data, intermediate results, and the like. In one embodiment, local register file 404 is physically or logically divided into P banks, each having some number of entries (where each entry might be, e.g., a 32-bit word). One bank is allocated to each processing unit, and corresponding entries in different banks can be populated with data for corresponding thread types to facilitate SIMD execution. The number of entries in local register file 404 is advantageously large enough to support multiple concurrent threads per processing engine 402.

Each processing engine 402 also has access, via a crossbar switch 405, to a global register file 406 that is shared among all of the processing engines 402 in core 310. Global register file 406 may be as large as desired, and in some embodiments, any processing engine 402 can read from or write to any location in global register file 406. In addition to global register file 406, some embodiments also provide an on-chip shared memory 408, which may be implemented, e.g., as a conventional RAM. On-chip memory 408 is advantageously used to store data that is expected to be used in multiple threads, such as coefficients of attribute equations, which are usable in pixel shader programs. In some embodiments, processing engines 402 may also have access to additional off-chip shared memory (not shown), which might be located, e.g., within graphics memory 124 of FIG. 1.

In one embodiment, each processing engine 402 is multi-threaded and can execute up to some number G (e.g., 24) of threads concurrently, e.g., by maintaining current state information associated with each thread in a different portion of its allocated bank in local register file 404. Processing engines 402 are advantageously designed to switch rapidly from one thread to another so that, for instance, a program instruction from a vertex thread could be issued on one clock cycle, followed by a program instruction from a different vertex thread or from a different type of thread such as a geometry thread or a pixel thread, and so on.

Instruction unit 412 is configured such that, for any given processing cycle, the same instruction (INSTR) is issued to all P processing engines 402. Thus, at the level of a single clock cycle, core 310 implements a P-way SIMD microarchitecture. Since each processing engine 402 is also multithreaded, supporting up to G threads, core 310 in this embodiment can have up to P*G threads in flight concurrently. For instance, if P=16 and G=24, then core 310 supports up to 384 concurrent threads.

Because instruction unit 412 issues the same instruction to all P processing engines 402 in parallel, core 310 is advantageously used to process threads in "SIMD groups." As used herein, a "SIMD group" refers to a group of up to P threads of execution of the same program on different input data, with one thread of the group being assigned to each processing engine 402. For example, a SIMD group might consist of P vertices, each being processed using the same vertex shader program. (A SIMD group may include fewer than P threads, in which case some of processing engines 402 will be idle during cycles when that SIMD group is being processed.) Since each processing engine 402 can support up to G threads, it follows that up to G SIMD groups can be in flight in core 310 at any given time.

On each clock cycle, one instruction is issued to all P threads making up a selected one of the G SIMD groups. To indicate which thread is currently active, a "group index" (GID) for the associated thread may be included with the instruction. Processing engine 402 uses group index GID as a context identifier, e.g., to determine which portion of its allocated bank in local register file 404 should be used when executing the instruction. Thus, in a given cycle, all processing engines 402 in core 310 are nominally executing the same instruction for different threads in the same group.

It should be noted that although all threads within a group are executing the same program and are initially synchronized with each other, the execution paths of different threads in the group might diverge during the course of executing the program. For instance, a conditional branch in the program might be taken by some threads and not taken by others. Each processing engine 402 advantageously maintains a local program counter (PC) value for each thread it is executing; if an instruction for a thread is received that does not match the local PC value for that thread, processing engine 402 simply ignores the instruction (e.g., executing a no-op).

Instruction unit 412 advantageously manages instruction fetch and issue for each SIMD group so as to ensure that threads in a group that have diverged eventually resynchronize. In one embodiment, instruction unit 412 includes program counter (PC) logic 414, a program counter register array 416, a multiplexer 418, arbitration logic 420, fetch logic 422, and issue logic 424. Program counter register array 416 stores G program counter values (one per SIMD group), which are updated independently of each other by PC logic 414. PC logic 414 updates the PC values based on information received from processing engines 402 and/or fetch logic 422. PC logic 414 is advantageously configured to track divergence among threads in a SIMD group and to select instructions in a way that ultimately results in the threads resynchronizing.

Fetch logic 422, which may be of generally conventional design, is configured to fetch an instruction corresponding to a program counter value PC from an instruction store (not shown) and to provide the fetched instructions to issue logic 424. In some embodiments, fetch logic 422 (or issue logic 424) may also include decoding logic that converts the instructions into a format recognizable by processing engines 402.

Arbitration logic 420 and multiplexer 418 determine the order in which instructions are fetched. More specifically, on each clock cycle, arbitration logic 420 selects one of the G possible group indices GID as the SIMD group for which a next instruction should be fetched and supplies a corresponding control signal to multiplexer 418, which selects the corresponding PC. Arbitration logic 420 may include conventional logic for prioritizing and selecting among concurrent threads (e.g., using round-robin, least-recently serviced, or the like), and selection may be based in part on feedback information from fetch logic 422 or issue logic 424 as to how many instructions have been fetched but not yet issued for each SIMD group.

Fetch logic 422 provides the fetched instructions, together with the group index GID and program counter value PC, to issue logic 424. In some embodiments, issue logic 424 maintains a queue of fetched instructions for each in-flight SIMD group. Issue logic 424, which may be of generally conventional design, receives status information from processing engines 402 indicating which SIMD groups are ready to execute a next instruction. Based on this information, issue logic 424 selects a next instruction to issue and issues the selected instruction, together with the associated PC value and GID. Each processing engine 402 either executes or ignores the instruction, depending on whether the PC value corresponds to the next instruction in its thread associated with group index GID.

In one embodiment, instructions within a SIMD group are issued in order relative to each other, but the next instruction to be issued can be associated with any one of the SIMD groups. For instance, if in the context of one SIMD group, one or more processing engines 402 are waiting for a response from other system components (e.g., off-chip memory or texture pipeline 314 of FIG. 3), issue logic 424 advantageously selects a group index GID corresponding to a different SIMD group.

For optimal performance, all threads within a SIMD group are advantageously launched on the same clock cycle so that they begin in a synchronized state. In one embodiment, core interface 308 advantageously loads a SIMD group into core 310, then instructs core 310 to launch the group. "Loading" a group may include supplying instruction unit 412 and processing engines 402 with input data and other parameters required to execute the applicable program. For example, in the case of vertex processing, core interface 308 loads the starting PC value for the vertex shader program into a slot in PC array 416 that is not currently in use; this slot corresponds to the group index GID assigned to the new SIMD group that will process vertex threads. Core interface 308 also loads vertex data into the local register file 404 or alternatively the global register file 406, for each processing engine 402 to execute one vertex thread.

Once all the data for the group has been loaded, core interface 308 launches the SIMD group by signaling to instruction unit 412 to begin fetching and issuing instructions corresponding to the group index GID of the new group. SIMD groups for geometry and pixel threads can be loaded and launched in a similar fashion.

Concurrent Access of Data Elements in a Shared Memory Resource

Figure 5:
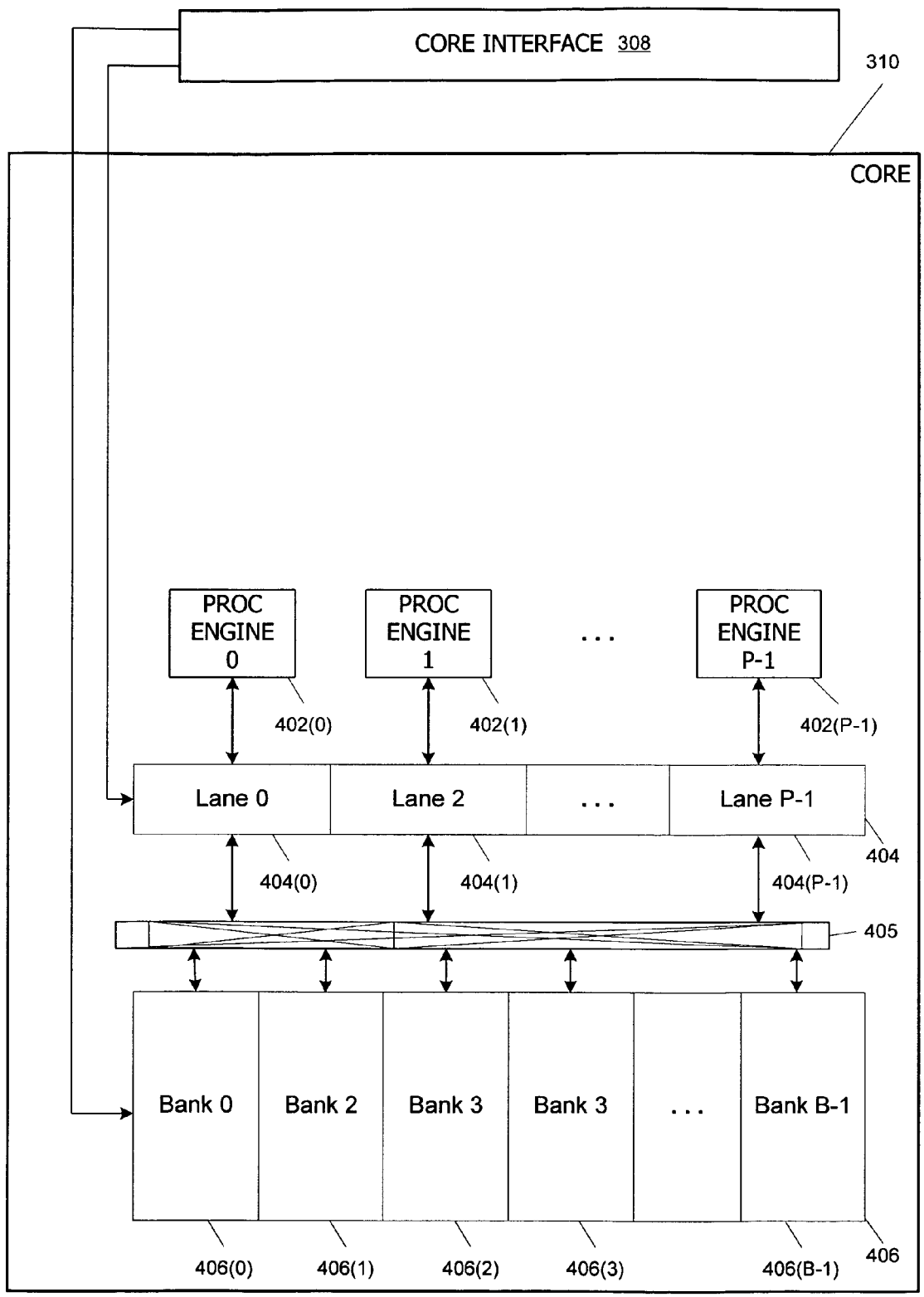
FIG. 5 is a more detailed block diagram of the components involved in loading data into appropriate storage locations for concurrent access by multiple processing engines, according to one embodiment of the present invention.

FIG. 5 is a more detailed block diagram of the components involved in loading data into appropriate storage locations for concurrent access by multiple processing engines 402, according to one embodiment of the present invention. The figure shows core interface 308, core 310, processing engines 402, local register file 404, crossbar switch 405, and global register file 406. Here, some components such as those previously described for instruction decoding have been omitted to better illustrate details of loading operations.

In various embodiments of the invention, data to be accessed by processing engines 402, such as vertex data, geometry data, and pixel data, are loaded into global register file 406, which is shared among processing engines 402. The present invention allows data to be stored in shared global register file 406 such that the data can be concurrently accessed in an efficient manner by different processing units 402, in order to support parallel processing. In other embodiments, data to be processed by processing engines 402 are loaded into local register file 404, which includes dedicated banks each allocated to a specific processing engine, as previously discussed. Here, the banks of local register file 404 are labeled as banks 404(0), 404(1), . . . , 404(P−1).

As shown in FIG. 5, global register file 406 is organized into B concurrently addressable banks, labeled as banks 406(0), 406(1), . . . , 406 (B−1). In certain embodiments, the number of banks B may be equal to the number of processors P. In other embodiments, B may not be equal to P. Each bank contains a number of data entries. Each data entry may hold a particular amount of data, such as a 32-bit word. The banks allow concurrent access such that at any given time, each bank can be separately reached to access a data entry within that bank. The banks may be synchronized to the same clock timing. Thus, in one clock cycle, a selected data entry in bank 402(0), a selected data entry in bank 402(1), . . . , and a selected data entry in 406(B−1) may all be concurrently accessed in parallel. In each bank, a register address or index may be specified to select the data entry to be accessed. The register address or index specified in one bank can be different than the register address or index specified in another bank. That is, in each clock cycle, the data entry selected in one bank may be independent of the data entry selected in another bank.

Banks 406(0), 406(1), . . . , 406(B−1) of global register file 406 may be implemented in a variety of ways, as is known in the art. Just as an example, each bank may be implemented as a separate array of registers. The banks may also be implemented together as a unified register array with multiple ports, each port providing access to data entries within a particular bank. Furthermore, there may exist other global registers located in other processor cores and/or other processing clusters. The global register files, including global register file 406 shown in FIG. 5, may be implemented as separate register files, groups of register files, or a unified register file.

Global register file 406 is considered a shared memory resource because it allows access of data by multiple entities. Depending on its design, a shared memory resource may impose restrictions on how data is to be concurrently accessed. For example, in any given clock cycle, global register file 406 in the present embodiment of the invention only allows one data entry to be accessed in each bank. Thus, multiple data entries in different banks can be accessed concurrently. However, multiple data entries in the same bank can not be accessed concurrently. An attempt to access multiple data entries in the same bank is referred to herein as a "bank conflict."

Crossbar switch 405 allows each processing engine 402 to access any of the banks 406(0), 406(1), . . . , 406(B−1) of global register file 406. FIG. 5 shows one embodiment in which processing engines 402 are indirectly connected to crossbar switch 405, through local register file 404. In other embodiments, processing engines 402 may be directly connected to crossbar switch 405, either in addition or as an alternative to indirect connections through local register file 404. Using crossbar switch 405, each processing engine 402 may connect to a different bank of global register file 406 to access a particular data entry in the bank. In this manner, processing engines 402 may separately access data entries in global register file 406 in parallel.

Figure 6:
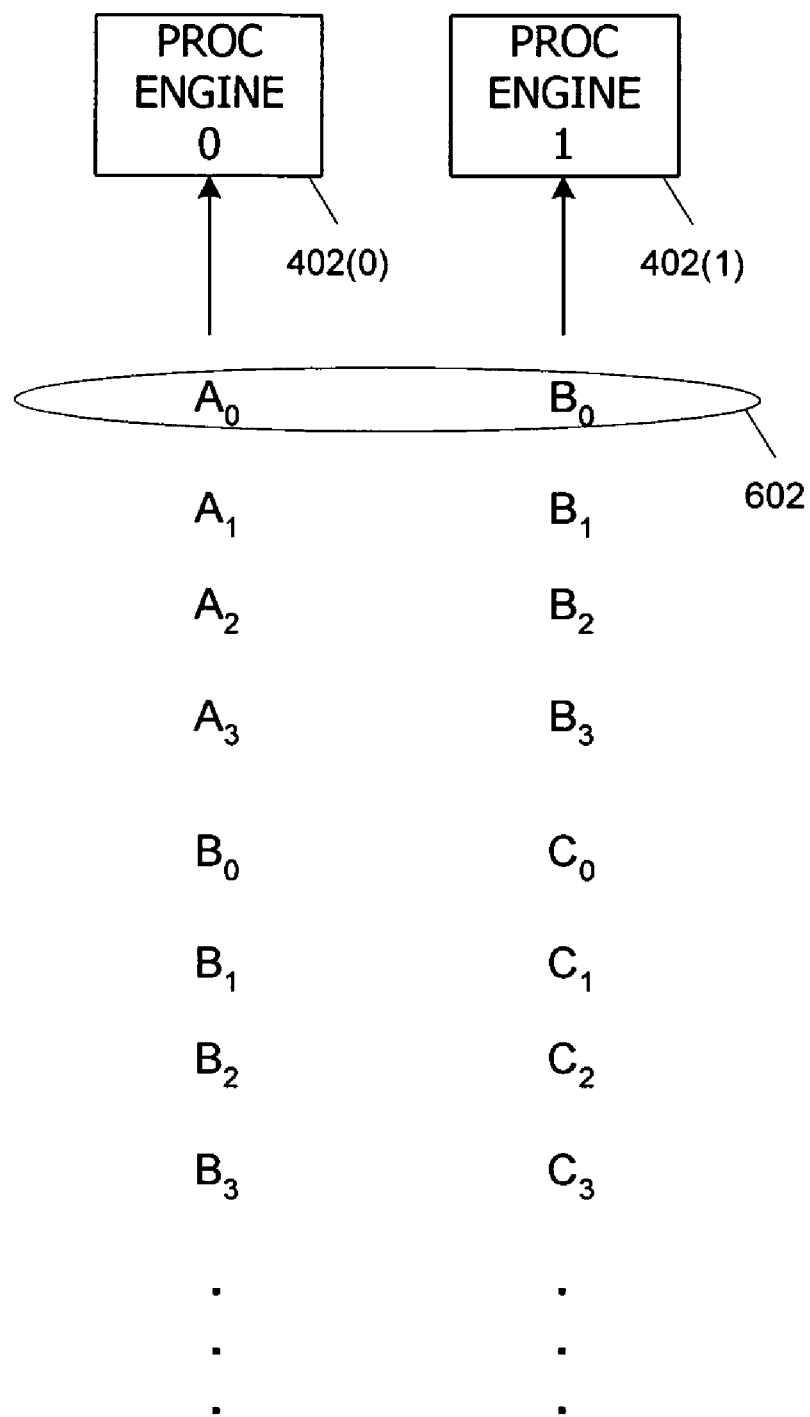
FIG. 6 illustrates a simple example of data that needs to be properly loaded into the banks of a global register file, so that the data can be accessed concurrently by two processing engines operating in parallel (P=2).

FIG. 6 illustrates a simple example of data that needs to be properly loaded into the banks of global register file 406, so that the data can be accessed concurrently by two processing engines 402(0) and 402(1) operating in parallel (P=2). Here, processing engine 402(0) needs to access data elements $A_0$, $A_1, A_2, A_3$. Concurrently, processing engine 402(1) needs to access data elements $B_0, B_1, B_2, B_3$. More specifically, as indicated by reference 602, processing engine 402(0)'s access of data element $A_0$ needs to occur in parallel with processor 402(1)'s access of data element $B_0$. Next, processing engine 402(0)'s access of data element $A_1$ needs to occur in parallel with processor 402(1)'s access of data element $B_1$, and so on.

The data elements shown in FIG. 6 may represent different types of data. Just as an example, the data elements may represent vertex data. Thus, data elements $A_0, A_1, A_2, A_3$ may constitute data corresponding to a particular vertex to be processed by processing engine 402(0). Data elements $B_0$, $B_1, B_2, B_3$ may constitute data corresponding to another vertex to be processed by processing engine 402(0). Other suitable types of data include geometry data and pixel data.

As discussed previously, processing engines such as 402(0) and 402(1) are capable of executing different threads. For example, processing engine 402(0) may be executing one thread by accessing a vertex comprised of data elements $A_0$, $A_1, A_2, A_3$. Concurrently, processing engine 402(1) may be executing another thread by accessing a different vertex comprised of data elements $B_0, B_1, B_2, B_3$. Furthermore, the execution of multiple threads may relate to a SIMD operation, as previously explained. The thread executed by processing engine 402(0) and the thread executed by processing engine 402(1) may be part of the same SIMD group being carried out in connection with a single instruction processed by instruction unit 412, shown in FIG. 4

Referring back to FIG. 6, processing engine 402(0) then accesses data elements $B_0, B_1, B_2, B_3$. Concurrently, processing engine 402(1) accesses data elements $C_0, C_1, C_2, C_3$. These data accesses may be associated with other threads executed by processing engines 402(0) and 402(1). As mentioned previously, processing engines such as 402(0) and 402(1) are multithreaded such that they can each quickly switch from the execution of one thread to the execution of another thread, using proper state information.

Figure 7:
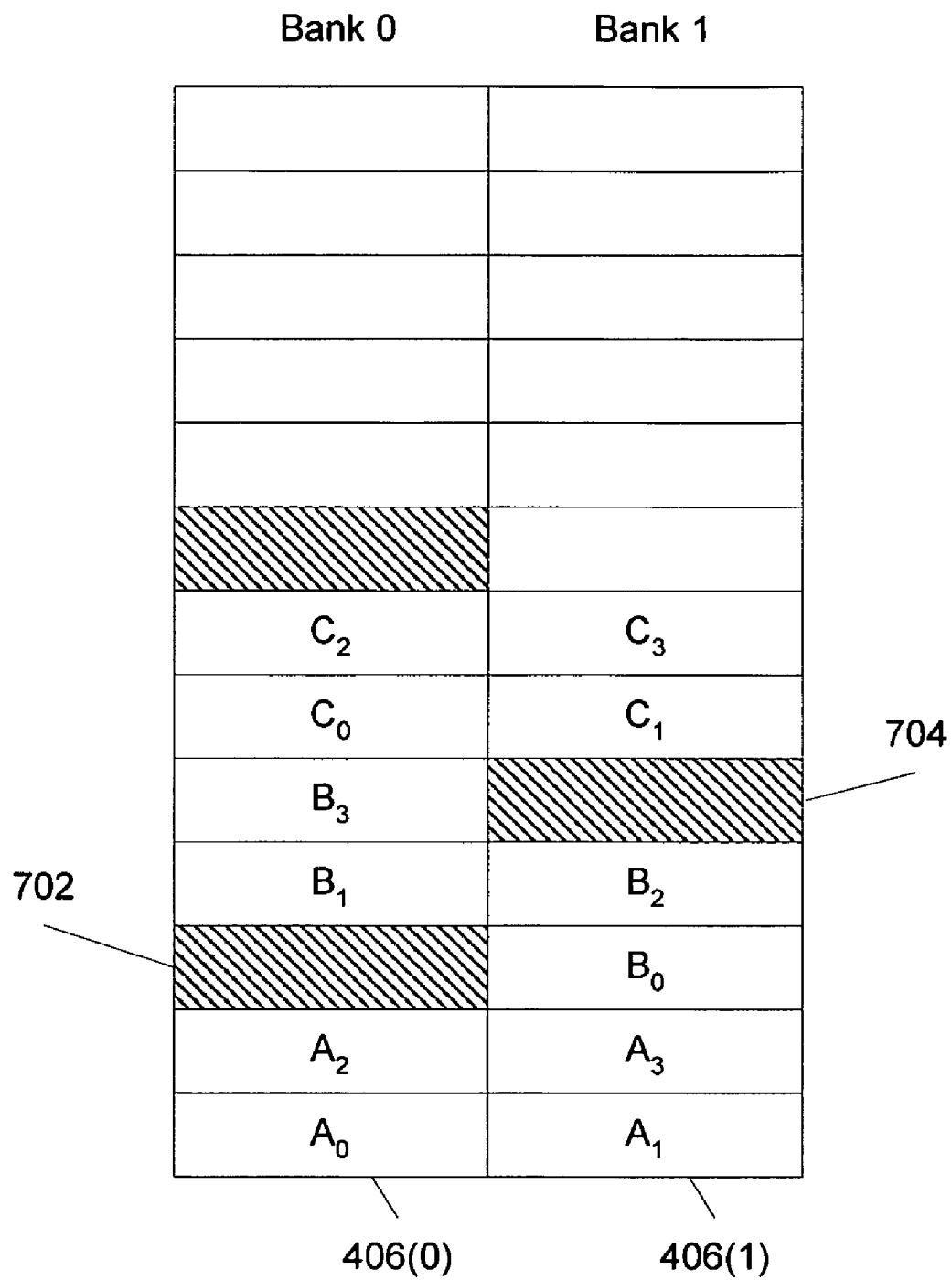
FIG. 7 presents an efficient manner of storing data elements across two banks (B=2) in a shared memory resource to allow concurrent access by two processing engines (P=2), according to one embodiment of the invention.

FIG. 7 presents an efficient manner of storing data elements across two banks (B=2) in a shared memory resource to allow concurrent access by two processing engines (P=2), according to one embodiment of the invention. Specifically, FIG. 7 shows how data elements $A_0, A_1, A_2, A_3, B_0, B_1, B_2$, $B_3$, and $C_0, C_1, C_2, C_3$ may be stored in a global register file 406 having two banks, such that the data elements are stored across the two banks, to allow concurrent access of data elements by processing engines 402(0) and 402(1) as shown in FIG. 6 without incurring any "bank conflicts."

First, data elements $A_0, A_1, A_2, A_3$ are stored into global register file 406 in a row-wise fashion across the two banks 406(0) and 406(1). Specifically, data element $A_0$ is stored in bank 406(0), and data element $A_1$ is stored in bank 406(1), filling up a first row. Then, data element $A_2$ is stored in bank 406(0), and data element $A_3$ is stored in bank 406(1), filling up a second row.

According to an embodiment of the invention, data element $B_0$ is not stored in bank 406(0) in a third row. Instead, a data entry 702 is skipped. Data element $B_0$ is stored after the skipped data entry 702, in bank 406(1) in the third row. Then, data elements $B_1$, $B_2$, $B_3$ are stored in a row-wise fashion to fill up a fourth row and begin to fill a fifth row. The skipped data entry 702 introduces an offset between the storage of data elements $A_0$, $A_1$, $A_2$, $A_3$ accessed by processing engine 402(0) and the storage of data elements $B_0$, $B_1$, $B_2$, $B_3$ accessed by processing engine 402(1).

This offset effectively eliminates potential "bank conflicts" that may otherwise occur as processing engines 402(0) and 402(1) attempt the concurrent accesses shown in FIG. 6. For example, in the same clock cycle, processing engine 402(0) may access data element $A_0$ while processor 402(1) accesses data element $B_0$, as indicated by reference 602 in FIG. 6. Referring back to FIG. 7, this concurrent access is now possible because data element $A_0$ is stored in bank 406(0), and data element $B_0$ is stored in bank 406(1). In other words, the offset introduced by the skipped data element 702 allows data elements $A_0$ and $B_0$ to be stored in different banks. As a result, data elements $A_0$ and $B_0$ can be accessed in the same clock cycle by separately accessing bank 406(0) and bank 406(1). Processing engine 402(0) can reach bank 406(0) via crossbar switch 405, which is shown in FIG. 5. Similarly, processing engine 402(1) can reach bank 406(1) via crossbar switch 405. No "bank conflict" arises in this clock cycle because the two concurrently accessed data element are now stored within distinct banks of global register file 406.

Returning to FIG. 7, data elements $C_0$, $C_1$, $C_2$, $C_3$ can be stored in a similar manner. Specifically, after storing data element $B_3$, a data entry 704 is skipped. Data elements $C_0$, $C_1$, $C_2$, $C_3$ are stored in a row-wise fashion after the skipped data entry 704. The offset introduced by skipped data element 704 allows processing engines 402(0) to access data elements $B_0$, $B_1$, $B_2$, $B_3$, and 402(1) to concurrently access data elements $C_0$, $C_1$, $C_2$, $C_3$, as shown in FIG. 6, without incurring "bank conflicts." The storage of data elements across multiple banks in a row-wise fashion, using skipped data entries, allows data elements to be accessed concurrently without incurring "bank conflicts." By contrast, if the data elements are stored in a column-wise fashion, "bank conflicts" are likely to occur. For example, consider the scenario where the data elements shown in FIG. 6 are instead stored in a column-wise fashion, such that data elements accessed by processing engine 402(0) are stored in bank 406(0), and data elements accessed by processing engine 402(1) are stored in bank 406(1). Since processing engine 402(0) first accesses data elements $A_0$, $A_1$, $A_2$, $A_3$, then accesses data elements $B_0$, $B_1$, $B_2$, $B_3$, data elements $A_0$, $A_1$, $A_2$, $A_3$ and $B_0$, $B_1$, $B_2$, $B_3$ may be stored in bank 406(0). Since processing element 406(1) accesses data elements $C_0$, $C_1$, $C_2$, $C_3$, data elements $C_0$, $C_1$, $C_2$, $C_3$ may be stored in bank 406(1). Such an arrangement can lead to catastrophic "bank conflicts," wherein a series of consecutive concurrent accesses all experience conflict. Specifically, when processing engine 402(0) accesses data element $A_0$, and processing engine 402(1) accesses data element $B_0$, a "bank conflict" occurs. Next, when processing engine 402(0) accesses data element $A_1$, and processing engine 402(1) accesses data element $B_1$, a "bank conflict" again occurs. This repeatedly happens for the entire series of consecutive data elements $A_0$, $A_1$, $A_2$, $A_3$ and $B_0$, $B_1$, $B_2$, $B_3$. Such catastrophic "bank conflicts" can easily take place if data elements are store in a column-wise fashion. Returning to FIG. 7, by storing data elements across multiple banks in a row-wise fashion, with skipped data entries, data elements can be arranged such that they can be accessed concurrently without incurring "bank conflicts."

Here, data entries in global register file 406 are characterized as being in "rows" that extend across multiple banks of the register file. These rows may represent a conceptual organization of the data entries within global register file 406. The rows may not necessarily refer to an actual physical alignment of memory cells, although that may be the case in some embodiments. For example, each "row" may simply represent data entries having the same or similar index or address within their respective banks. Thus the first "row" shown in FIG. 7 (storing data elements $A_0$ and $A_1$) may include an entry in bank 406(0) having a particular register index or address, as well as an entry in bank 406(1) having the same register index or address. The second "row" (storing data elements $A_2$ and $A_3$) may include an entry in banks 406(0) having a subsequent (e.g., next higher) register index or address, as well as an entry in bank 406(1) having the same subsequent register index or address, and so on.

In the present embodiment of the invention, the skipped data entry 702 is simply left unused. In other embodiments, the skipped data entry may be used to store other data.

The decision to skip an entry in the storage of data elements into global register file 406 can be made by a component responsible for managing the loading of data in preparation for access by processing engines 402. In certain embodiments, the data elements correspond to vertex data and/or geometry data, and the geometry control unit 304 shown in FIG. 3 makes the decision. In certain other embodiments, the data elements correspond to pixel data, and the pixel control unit 306 shown in FIG. 3 makes the decision.

The decision to skip one or more entries may involve one or more calculations. In one embodiment of the invention, after each group of data elements (such as $A_0$, $A_1$, $A_2$, $A_3$) is stored, a sufficient number of data entries are skipped such that the total number of data entries advanced, referred to here as "size_total," which is the sum of the number of stored entries (D) and the number skipped entries (S), is such that size_total modulo (%) the number of banks, B, would equal to L, which is a positive, non-zero integer. In the present embodiment of the invention, L is set to one (1). However, in other embodiments, L may be set to a different positive, non-zero integer, such as two (2), three (3), etc. In equation form, this expression according to the present embodiment is shown as:

size_total=number_of_stored_data_entries+number_of_skipped_data_entries size_total % $B=L=1$ Combining the two equations above into one equation yields:

(number_of_stored_data_entries+number_of_skipped_data_entries) % $B=L=1$

In the example shown in FIG. 7, the number of stored data entries associated with each group of data elements (such as $A_0$, $A_1$, $A_2$, $A_3$) is equal to 4. The number of banks, B, is equal to 2. Inserting these values into the equation above yields:

(4+number_of_skipped_data_entries) % $2=L=1$

This equation can be satisfied by setting "number_of_skipped_data_entries" to a value of one (1). That is, (4+1) % $2=L=1$. Thus, the number of skipped entries is set to one (1):

number_of_skipped_data_entries=1

Correspondingly, as shown in FIG. 7, one (1) data entry is skipped after the group of data elements $A_0$, $A_1$, $A_2$, $A_3$ are stored. Similarly, one data entry is skipped after the group of data elements $B_0$, $B_1$, $B_2$, $B_3$ are stored, and so on. Of course, in other instances, the above calculation can yield a value for number_of_skipped_data_entries that is not equal to one (1). For example the number of skipped data entries may equal to zero (0), two (2), or some other value.

The location of each group of data elements stored in global register file 406 may be forwarded to the relevant processing engine 402. This way, even if one or more data entry is skipped in the course of storing data elements in global register file 406, the relevant processing engine 402 can still access the correct location within global register file 406 to obtain the proper data elements to be processed. In one embodiment of the invention, location information regarding where data elements are stored for each processing engine 402 is forwarded via the local register file 404. Specifically, the register index or address of data elements stored for a particular processing engine 402 may be forwarded to the dedicated bank (in local register file 404) allocated to that processing engine 402. Thus, when the processing engine proceeds to access the data elements it needs, it will know the exact location within global register file 406 where the data elements are stored.

Figure 8A:
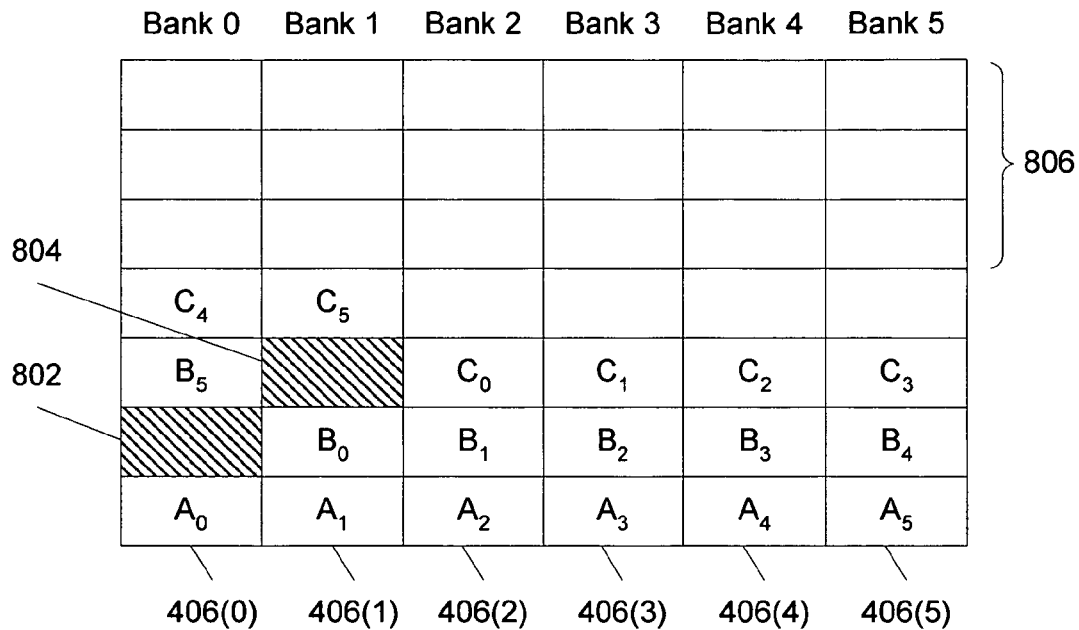
FIG. 8A presents an efficient manner of storing data elements across six banks (B=6) in a shared memory resource to allow concurrent access by three processing engines (P=3), according to one embodiment of the invention.

FIG. 8A presents an efficient manner of storing data elements across six banks (B=6) in a shared memory resource to allow concurrent access by three processing engines (P=3), according to one embodiment of the invention.

For example, processing engines 402(0), 402(1), and 402(2) may be operating in parallel. Processing engine 402(0) needs to access data elements $A_0$, $A_1$, $A_2$, $A_3$. Processing engine 402(1) needs to access data elements $B_0$, $B_1$, $B_2$, $B_3$. Processing engine 402(2) needs to access data elements $C_0$, $C_1$, $C_2$, $C_3$. More specifically, in one clock cycle, the following three concurrent data accesses are required: processing engine 402(0) accesses data element $A_0$, processing engine 402(1) accesses data element $B_0$, and processing engine 402(2) accesses data element $C_0$. In the next clock cycle, three other concurrent data accesses are required: processing engine 402(0) accesses data element $A_1$, processing engine 402(1) accesses data element $B_1$, and processing engine 402(2) accesses data element $C_1$. The remaining data elements are concurrently accessed in a similar manner.

According to the present embodiment of the invention, data elements $A_0$, $A_1$, $A_2$, $A_3$, $B_0$, $B_1$, $B_2$, $B_3$, and $C_0$, $C_1$, $C_2$, $C_3$ are stored in a row-wise fashion across the six available banks 406(0) through 406(5) to facilitate such concurrent data accesses. Data entries 802 and 804 are skipped in order to introduce offsets that allow concurrently accessed data elements to be stored in different banks. For example, as result of the offsets introduced by the skipped data entries 802 and 804, data elements $A_0$, $B_0$, and $C_0$ are stored in different banks 406(0), 406(1), and 406(2). Consequently, in one clock cycle, the following three concurrent data accesses are possible: processing engine 402(0) accesses data element $A_0$, processing engine 402(1) accesses data element $B_0$, and processing engine 402(2) accesses data element $C_0$. Similarly, in the next clock cycle, another three concurrent data accesses are possible: processing engine 402(0) accesses data element $A_1$, processing engine 402(1) accesses data element $B_1$, and processing engine 402(2) accesses data element $C_1$. The remaining data elements can be concurrently accessed in a similar manner.

As FIG. 8A shows, an advantage to storing data elements in a row-wise fashion across multiple banks in a shared memory resource is that the memory resource is naturally compacted to fill up all banks evenly. Thus, there is more remaining space 806 that spans across all banks and is readily useful for other purposes. By the same token, when the space used to store the data elements such as $A_0$, $A_1$, $A_2$, $A_3$, $B_0$, $B_1$, $B_2$, $B_3$, and $C_0$, $C_1$, $C_2$, $C_3$ is freed up (e.g., when processing based on those data elements is complete), the storage space that is released also spans across all banks and is readily useful for other purposes. Benefits associated with storage of data elements in a row-wise fashion across multiple banks, such as those relating to the details above, can significantly outweigh the relatively minor cost of skipping data entries 802 and 804, to facilitate concurrent accesses to data elements.

Figure 8B:
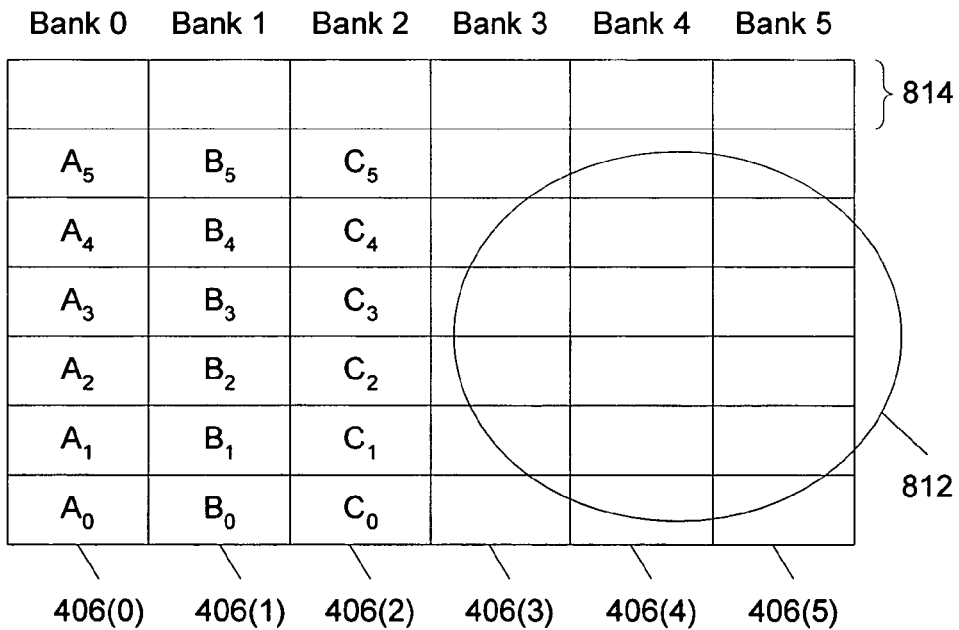
FIG. 8B presents a manner of storing data elements along dedicated banks selected from six available banks (B=6) in a shared memory resource to allow concurrent access by three processing engines (P=3).

FIG. 8B presents a manner of storing data elements along dedicated banks selected from six available banks (B=6) in a shared memory resource to allow concurrent access by three processing engines (P=3). Storage of data for processing engines 402 in dedicated banks is similar in operation to the storage of data in dedicated banks in local register file 404. As mentioned previously, this manner of storing data elements along dedicated banks in a column-wise fashion may lead to catastrophic "bank conflicts." In FIG. 8B, it is assumed for the moment that such catastrophic "bank conflicts" do not occur. Even so, the arrangement in FIG. 8B exhibits further disadvantages, as discussed below.

Here, processing engines 402(0), 402(1), and 402(2) may be operating in parallel. Processing engine 402(0) needs to access data elements $A_0$, $A_1$, $A_2$, $A_3$. Processing engine 402(1) needs to access data elements $B_0$, $B_1$, $B_2$, $B_3$. Processing engine 402(2) needs to access data elements $C_0$, $C_1$, $C_2$, $C_3$. More specifically, in one clock cycle, the following three concurrent data accesses are required: processing engine 402(0) accesses data element $A_0$, processing engine 402(1) accesses data element $B_0$, and processing engine 402(2) accesses data element $C_0$. In the next clock cycle, three other concurrent data accesses are required: processing engine 402(2) accesses data element $A_1$, processing engine 402(1) accesses data element $B_1$, and processing engine 402(2) accesses data element $C_1$. The remaining data elements are concurrently accessed in a similar manner.

Still referring to FIG. 8B, data elements $A_0$, $A_1$, $A_2$, $A_3$, $B_0$, $B_1$, $B_2$, $B_3$, and $C_0$, $C_1$, $C_2$, $C_3$ are stored in three separate banks selected from the six available banks 406(0) through 406(5) to facilitate concurrent data accesses. Specifically, data elements $A_0$, $A_1$, $A_2$, $A_3$ are stored in bank 406(0). Data elements $B_0$, $B_1$, $B_2$, $B_3$ are stored in bank 406(1). Finally, data elements $C_0$, $C_1$, $C_2$, $C_3$ are stored in bank 406(2). This straight forward manner of storing groups of data elements in separate, dedicated banks supports concurrent accesses. Specifically, in one clock cycle, the following three concurrent data accesses are possible: processing engine 402(0) accesses data element $A_0$, processing engine 402(1) accesses data element $B_0$, and processing engine 402(2) accesses data element $C_0$. Similarly, in the next clock cycle, another three concurrent data accesses are possible: processing engine 402(0) accesses data element $A_1$, processing engine 402(1) accesses data element $B_1$, and processing engine 402(2) accesses data element $C_1$. The remaining data elements can be concurrently accessed in a similar manner.

As FIG. 8B shows, additional disadvantages to storing data elements in separate, dedicated banks in a shared memory resource relate to the fact that storage is not distributed across the banks evenly. There is less remaining space 814 that spans across all banks and is readily useful for other purposes. This is because space 812 in the other banks 406(3), 406(4), and 406(5) is left unused. Space 812 does not span across all banks and is therefore less likely to be useful for other purposes. If space 812 is somehow allocated for other purpose, and subsequently the space used to store the data elements $A_0$, $A_1$, $A_2$, $A_3$, $B_0$, $B_1$, $B_2$, $B_3$, and $C_0$, $C_1$, $C_2$, $C_3$ is freed up (e.g., when processing based on those data elements is complete), the storage space that is released is likely to not span across all banks because it may not include space 812, which could still be occupied. Thus, the storage of data elements in separate, dedicated banks (as illustrated in FIG. 8B) may cause significant storage allocation inefficiencies, which can be avoided by adopting the storage of data elements in a row-wise fashion across multiple banks (as illustrated in FIG. 8A).

Figure 9:
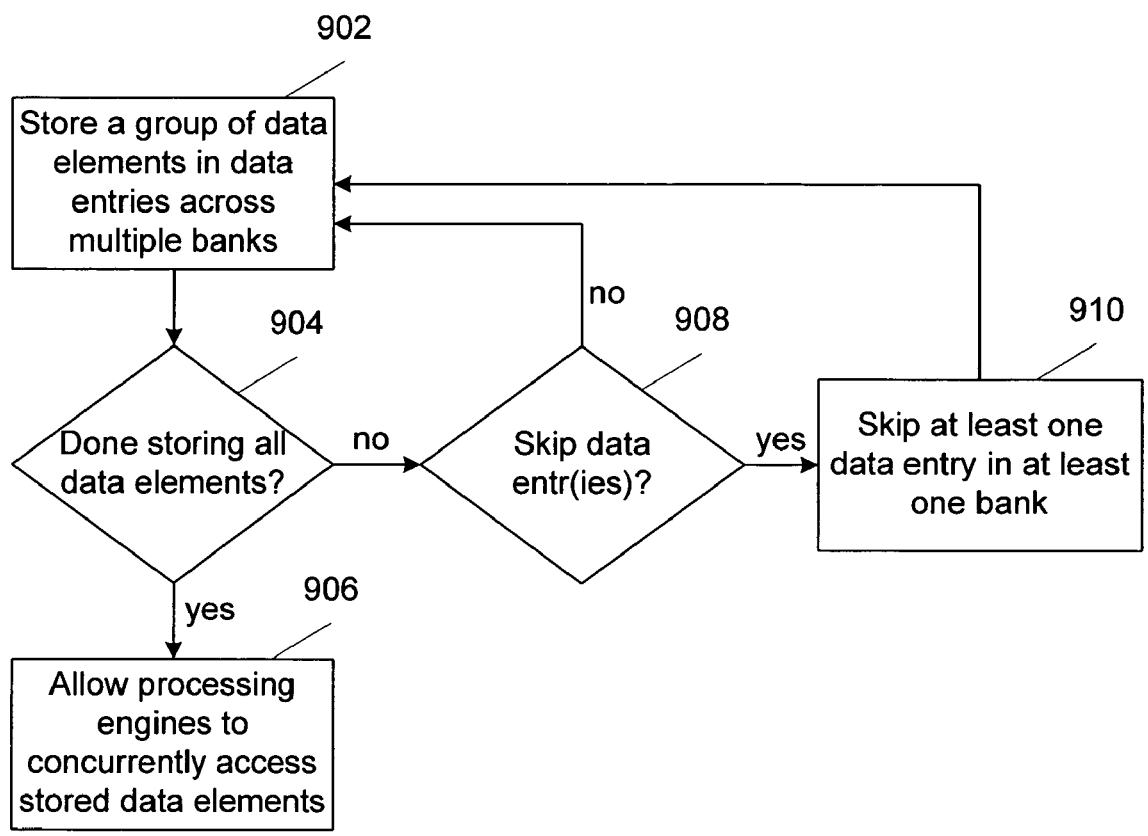
FIG. 9 is a flow chart depicting illustrative steps in a process for storing data elements in a row-wise fashion across multiple banks in a shared memory resource, in accordance with one embodiment of the invention.

FIG. 9 is a flow chart depicting illustrative steps in a process 900 for storing data elements in a row-wise fashion across multiple banks in a shared memory resource, in accordance with one embodiment of the invention.

Steps 902, 904, 908, and 910 relate to the "loading" of data elements into a shared memory resource. In step 902, a group of data elements are store in a row-wise fashion across multiple banks of the shared memory resource. In step 904, a determination is made as to whether all relevant data elements have been stored to the shared memory resource. This may refer to a batch of data elements designated for the current "loading" process, which may including the loading of data elements for a SIMD instruction or a plurality of SIMD instructions. If all relevant data elements have been stored to the shared memory resource, then the process continues to step 906. If not, the process continues to step 908. In step 908, a determination is made as to whether one or more data entries are to be skipped before storing the next group of data elements. If so, the process continues to step 910, in which one or more data entries are skipped. If not, the process returns to step 902, in which the next group of data elements are stored. After step 910, the process also returns to 902.

Step 906 relates to the subsequent access of the stored data elements by a plurality of processing units operating to execute multiple threads in parallel. The processing units may be implemented as separate processing engines such as processing engines 402(0) and 402(1) in a processing core such as processing core 310 (shown in FIG. 4), located in a processing cluster such as processing cluster 302 (shown in FIG. 3) within a processor such as GPU 122 (shown in FIG. 2).

The multiple threads executed at a given point in time may belong to a common SIMD group. That is, a single instruction may result in the execution of a particular operation or series of operation on multiple data elements. In step 906, the processing units are allowed to access the data elements stored in the shared memory resource in a concurrent manner, as previously described. The arrangement of the stored data elements across the multiple banks facilitates this concurrent access. Specifically, offsets introduced by skipped data entries ensure that data elements to be accessed concurrently (e.g., in the same clock cycle) are stored in different banks, thus avoiding bank conflicts.

The steps shown in process 900 may represent intermediate steps performed in an overall technique for processing data elements in a system. That is, there may exist steps not shown in FIG. 9 that occur prior to or subsequent to process 900.

While the present invention has been described in terms of specific embodiments, it should be apparent to those skilled in the art that the scope of the present invention is not limited to the described specific embodiments. The specification and drawings are, accordingly, to be regarded in an illustrative rather than a restrictive sense. It will, however, be evident that additions, subtractions, substitutions, and other modifications may be made without departing from the broader spirit and scope of the invention as set forth in the claims.

What is claimed is:

1. A method for performing multiple concurrent accesses in a shared memory resource, the shared memory resource comprising a plurality of banks, each bank comprising a plurality of data entries, the plurality of banks allowing concurrent access such that multiple data entries, each from a different bank, are capable of being accessed concurrently, the method comprising:

storing a first group of data elements in data entries across multiple banks in the shared memory resource, a first data element of the first group of data elements being stored in a data entry in a first bank;

determining, responsive to a number (D) of stored data entries associated with the first group and a number (B) of banks in the plurality of banks, a number (S) of data entries to skip after storing a last data element of the first group of data elements, wherein (S) is determined according to ((D+S) modulo B) is equal to M, M being a positive, non-zero integer;

following the (S) skipped data entries or, if no offset is to be introduced, following the first group of data elements, storing a second group of data elements in data entries across multiple banks in the shared memory resource, a first data element of the second group of data elements being stored in a data entry in a second bank different from the first bank; and concurrently accessing the first data element of the first group of data elements from the first bank and the first data element of the second group of data elements from the second bank, wherein the first data element of the first group of data elements is accessed by a first processing unit, and the first data element of the second group of data elements is accessed by a second processing unit.

2. The method of claim 1, wherein the number (S) is equal to zero.

3. The method of claim 1 wherein M is equal to one (1).

4. The method of claim 1 wherein each of the first and second groups of data elements occupies multiple rows of data entries, wherein each row includes one data entry from each of the plurality of banks.

5. The method of claim 1,
wherein the first processing unit is capable of accessing the first data element of the first group of data elements to perform an operation associated with a single instruction, multiple data (SIMD) instruction; and
wherein the second processing unit is capable of accessing the first data element of the second group of data elements to perform a corresponding operation associated with the same SIMD instruction.

6. The method of claim 1 wherein the first and second processing units are implemented as separate processing engines in a processing core within a processor.

7. The method of claim 1 wherein the first group of data elements comprises vertex data associated with a first vertex, and the second group of data elements comprises vertex data associated with a second vertex.

8. The method of claim 1 wherein the first group of data elements comprises pixel data associated with a first pixel, and the second group of data elements comprises pixel data associated with a second pixel.

9. An apparatus for performing multiple concurrent accesses in a shared memory resource comprising:

a shared memory resource comprising a plurality of banks, each bank comprising a plurality of data entries, the plurality of banks allowing concurrent access such that multiple data entries, each from a different bank, are capable of being accessed concurrently;

a control unit operatively coupled to the shared memory resource, the control unit capable of causing a first group of data elements to be stored in data entries across multiple banks in the shared memory resource, a first data element of the first group of data elements being stored in a data entry in a first bank;

wherein the control unit is capable of determining, responsive to a number (D) of stored data entries associated with the first group and a number (B) of banks in the plurality of banks, a number (S) of data entries to skip after storage of a last data element of the first group of data elements, wherein (S) is determined according to ((D+S) modulo B) is equal to M, M being a positive, non-zero integer;

wherein the control unit is capable of causing a second group of data elements to be stored in data entries across multiple banks in the shared memory resource following the (S) skipped data entries or, if no offset is to be introduced, following the first group of data elements, wherein a first data element of the second group of data elements is stored in a data entry in a second bank different from the first bank; and wherein the shared memory resource supports concurrent access of the first data element of the first group of data elements from the first bank and the first data element of the second group of data elements from the second bank, wherein the first data element of the first group of data elements is accessed by a first processing unit, and the first data element of the second group of data elements is accessed by a second processing unit.

10. The apparatus of claim 9, wherein the number (S) is equal to zero.

11. The method of claim 9 wherein L is equal to one (1).

12. The apparatus of claim 9, wherein the first processing unit is capable of accessing the first data element of the first group of data elements to perform an operation associated with a single instruction, multiple data (SIMD) instruction; and wherein the second processing unit is capable of accessing the first data element of the second group of data elements to perform a corresponding operation associated with the same SIMD instruction.

13. The apparatus of claim 9 wherein the first and second processing units are implemented as separate processing engines in a processing core within a processor.

14. The apparatus of claim 9 wherein the first group of data elements comprises vertex data associated with a first vertex, and the second group of data elements comprises vertex data associated with a second vertex.

15. The apparatus of claim 9 wherein the first group of data elements comprises pixel data associated with a first pixel, and the second group of data elements comprises pixel data associated with a second pixel.

16. The apparatus of claim 9 wherein the shared memory resource is a register file comprising multiple banks of registers.

17. A system for performing multiple concurrent accesses in a shared memory resource, the shared memory resource comprising a plurality of banks, each bank comprising a plurality of data entries, the plurality of banks allowing concurrent access such that multiple data entries, each from a different bank, are capable of being accessed concurrently, the system comprising:

means for storing a first group of data elements in data entries across multiple banks in the shared memory resource, a first data element of the first group of data elements being stored in a data entry in a first bank;

means for determining, responsive to a number (D) of stored data entries associated with the first group and a number (B) of banks in the plurality of banks, a number (S) of data entries to skip after storing a last data element of the first group of data elements, wherein (S) is determined according to ((D+S) modulo B) is equal to M, M being a positive, non-zero integer;

means for, following the (S) skipped data entries or, if no offset is to be introduced, following the first group of data elements, storing a second group of data elements in data entries across multiple banks in the shared memory resource, a first data element of the second group of data elements being stored in a data entry in a second bank different from the first bank; and means for concurrently accessing the first data element of the first group of data elements from the first bank and the first data element of the second group of data elements from the second bank, wherein the first data element of the first group of data elements is accessed by a first processing unit, and the first data element of the second group of data elements is accessed by a second processing unit.

* * * * *